US012361283B2

(12) United States Patent
Ott et al.

(10) Patent No.: US 12,361,283 B2
(45) Date of Patent: Jul. 15, 2025

(54) SYSTEM AND METHOD FOR TRAINING A NEURAL ODE NETWORK

(71) Applicant: Robert Bosch GmbH, Stuttgart (DE)

(72) Inventors: Katharina Ott, Renningen (DE); Michael Tiemann, Tuebingen (DE); Prateek Katiyar, Tuebingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 840 days.

(21) Appl. No.: 17/351,772

(22) Filed: Jun. 18, 2021

(65) Prior Publication Data
US 2022/0036181 A1 Feb. 3, 2022

(30) Foreign Application Priority Data

Jul. 29, 2020 (EP) .................... 20188303

(51) Int. Cl.
G06N 3/08 (2023.01)
G06F 18/21 (2023.01)
G06F 18/2431 (2023.01)
G06V 10/75 (2022.01)

(52) U.S. Cl.
CPC ............ *G06N 3/08* (2013.01); *G06F 18/217* (2023.01); *G06F 18/2431* (2023.01); *G06V 10/751* (2022.01)

(58) Field of Classification Search
CPC .................... G06N 3/08; G06N 7/08
See application file for complete search history.

(56) References Cited

PUBLICATIONS

Mishra, Asit, and Debbie Marr. "Apprentice: Using knowledge distillation techniques to improve low-precision network accuracy." arXiv preprint arXiv:1711.05852 (2017). (Year: 2017).*
Zhang, Jingfeng, et al. "Towards Robust ResNet: A Small Step but a Giant Leap." Proceedings of the Twenty-Eighth International Joint Conference on Artificial Intelligence, International Joint Conferences on Artificial Intelligence Organization, 2019. (Year: 2019).*
Adaptive Checkpoint Adjoint Method for Gradient Estimation in Neural ODE, Proceedings of the 37th International Conference on Machine Learning, PMLR 108, 2020 (Year: 2020).*
Commit—juntang-zhuang, torch_ACA@9658b2e—GitHub, https://github.com/juntang-zhuang/torch_ACA/commit/9658b2ecef241bfc69f9619100586fe2574ecdc2 (Year: 2020).*

(Continued)

Primary Examiner — Schyler S Sanks
(74) Attorney, Agent, or Firm — NORTON ROSE FULBRIGHT US LLP

(57) ABSTRACT

A computer-implemented method for training a neural network including a neural ordinary differential equation (ODE) block. A first ODE solver may be used to train the neural ODE block. A second ODE solver may be used to train and verify that the neural ODE block describes an ODE as an ODE flow. During a forward pass of an iteration of training, a first performance value is obtained by applying the first ODE solver to the neural ODE block and a second performance value is obtained by applying the second ODE solver to the neural ODE block. An accuracy parameter of the first ODE solver is adjusted based on the difference between the first performance value and the second performance value.

21 Claims, 7 Drawing Sheets

(56) References Cited

PUBLICATIONS

Xihui Yan and V. H. Quintana, "Improving an interior-point-based OPF by dynamic adjustments of step sizes and tolerances," in IEEE Transactions on Power Systems, vol. 14, No. 2, pp. 709-717, May 1999 (Year: 1999).*

Bogacki, Przemysław; Shampine, Lawrence F. (1989), "A 3(2) pair of Runge-Kutta formulas", Applied Mathematics Letters, 2 (4): 321-325, doi:10.1016/0893-9659(89)90079-7 (Year: 1989).*

J. C. Butcher, Jul. 26, 2016, Print ISBN:9781119121503, Online ISBN:9781119121534, DOI:10.1002/9781119121534, 2016, John Wiley & Sons, Ltd (Year: 2016).*

Zhuang et al., "Adaptive Checkpoint Adjoint Method for Gradient Estimation in Neural Ode," Proceedings of the 37th International Conference on Machine Learning, PMLR 108, 2020, pp. 1-24.

Onken et al., "Discretize-Optimize VS. Optimize-Discretize for Time-Series Regression and Continuous Normalizing Flows," Cornell University, 2020, pp. 1-24.

Finlay et al., "How to Train Your Neural Ode: The World of Jacobian and Kinetic Regularization," Proceedings of the 37th International Conference on Machine Learning, PMLR 119, 2020, pp. 1-14.

Chen et al., "Neural Ordinary Differential Equations," 32nd Conference on Neural Information Processing Systems (NEURIPS), 2018, pp. 1-19.

* cited by examiner

SYSTEM AND METHOD FOR TRAINING A NEURAL ODE NETWORK

CROSS REFERENCE

The present application claims the benefit under 35 U.S.C. § 119 of European Patent Application No. EP 20188303.0 filed on Jul. 29, 2020, which is expressly incorporated herein by reference in its entirety.

FIELD

The present invention relates to a computer-implemented method of training a neural ordinary differential equation (ODE) network and a corresponding system for training a neural network. The present invention further relates to a computer-readable medium comprising instructions to perform the above method.

BACKGROUND INFORMATION

The use of neural networks has become focal in myriad applications, ranging from healthcare and drug discovery to robotics, manufacturing and autonomous vehicles. In many applications, neural networks are trained to provide an output, such as a prediction or a decision. For example, a neural network may be trained to be a classifier, such as to classify an image into one or more classes (naturally, a semantic segmentation task and a detection task may be considered special cases of such a classification task). Using neural networks as classifiers, for example, is particularly appealing as it is possible to train the neural network by providing it with training data, for example a set of images and their corresponding classifications. Based on the training data (e.g., the known information), the neural network may determine and refine weights and other network parameters to obtain the correct classifications when given an input. These weights and parameters are highly dependent on the neural network architecture being employed, and have a considerable effect on the performance and reliability of the neural network.

The choice of neural network architecture may therefore be an important consideration. Among a plethora of options, Residual Neural Networks (commonly referred to as ResNets) have emerged as an important subclass of models, as they mitigate the gradient issues arising with training deep neural networks by adding skip connections between the successive layers.

In the paper entitled "Neural Ordinary Differential Equations" by Chen, Rubanova, Bettencourt and Duvenaud (available at https://arxiv.org/abs/1806.07366 and incorporated herein by reference), Neural Ordinary Differential Equation (Neural ODE) models (interchangeably referred to as Neural ODE networks) are described as an analogue of continuous-depth ResNets. Neural ODE models are a new family of deep neural network models, in which the derivative of a hidden state is parameterised through the neural network.

Neural ODEs offer the vast knowledge of ODE theory to be applied to deep learning research without relinquishing the sheer predictive performance of ResNets. For instance, it has been found that for specific perturbations, Neural ODEs are more robust than convolutional neural networks. Moreover, inspired by the theoretical properties of the solution curves, a regularizer has been proposed which improved the robustness of Neural ODE models even further. Robust neural ODE models may translate into more accurate, faster and more efficient image classification and may offer a host of benefits in a wide range of applications, such as safer and simultaneously more fuel-efficient autonomous driving, improved clinical diagnoses and more accurate optical inspection. However, if Neural ODEs are chosen for their theoretical advantages, it is important that the neural network exhibits the same qualitative behaviour as an analytical ODE flow. There is therefore a need to develop a training method and system which ensures that the resulting trained neural network corresponds to an analytical ODE flow, such as a time continuous dynamical system, which would allow the techniques and knowledge from the ODE field to be applied to the neural network.

SUMMARY

It is conventional to opt for finer discretisations of ODEs in order to behave as an analytical ODE flow. However, as the discretisation becomes finer, more computational resources and longer training time are needed to train the neural ODE network, which leads to a higher latency. In practice, longer training time and more computational resources may not be available. In many applications, neural network latency may be an important limitation. For example, the latency of an image classifier for autonomous driving may be limited, but the image classifier should still be robust. That is, using an excessively fine discretization may increase the time required for computation and processing, thus increasing latency. In autonomous driving, it is important that predictions, such as in obstacle tracking, are made quickly, that is with low latency. As a further example, many systems use continual learning. For example, when a device equipped with a neural network modelling an analytical ODE flow is deployed, it is particularly advantageous to automatically determine whether the neural network still corresponds to an analytical ODE flow such as a time continuous dynamical system, in order to preserve the robustness of the neural network. It is therefore desirable to obtain a training method which may ensure that the trained neural ODE block of the neural network describes an analytical ODE flow, such as a time continuous dynamical system, or at least to a sufficient degree, whilst reducing training time and computing resource requirements.

In accordance with the first aspect of the present invention, a computer-implemented method and corresponding training system for training a neural network comprising a neural ODE block is described. In accordance with an aspect of the present invention, a computer-readable medium is described.

Various aspects of the present invention relate to the training of a neural network comprising a neural ODE block. A neural ODE block of a neural network may be configured to describe a vector field of an ODE. When the neural ODE block is trained to describe an ODE flow such as a time continuous dynamical system, techniques from the field of ODE research may be used to improve predictions, classifications and similar tasks. The neural network comprises the neural ODE block. The neural ODE block may be a section of a neural network, or an entire neural network, which is designed to approximate an analytical ODE flow. A method for training a neural network comprises accessing model data defining the neural network and accessing a training dataset comprising a plurality of batches of training data. The method further comprises training the neural network on the training dataset and using a first ODE solver. A second ODE solver is also accessed. The training comprises initialising an accuracy parameter of the first ODE solver and adjusting the accuracy parameter during the training by, during a forward pass of an iteration of the training, obtaining a first output of the neural network and obtaining a second output of the neural network. The first output of the neural network is obtained by providing a layer output upstream of the neural ODE block to the first ODE solver, applying the first ODE solver to the neural ODE block to obtain an output of the first ODE solver, and feeding the output of the first ODE solver into a layer downstream of the neural ODE block. The second output of the neural network is obtained by providing the layer output upstream of the neural ODE block to the second ODE solver, applying the second ODE solver to the neural ODE block to obtain an output of the second ODE solver, and feeding the output of the second ODE solver into a layer downstream of the neural ODE block. The method further comprises evaluating a performance function using the first output of the neural network to obtain a first performance value, and evaluating the performance function using the second output of the neural network to obtain a second performance value. The method further comprises adjusting the accuracy parameter of the first ODE solver based on a difference between the first performance value and the second performance value.

In order to train the neural network comprising the neural ODE block, the numerical solution where the neural ODE block is evaluated at discrete points in time may be optimised. However, if the numerical solver is too coarsely discretised, the neural ODE block becomes dependent on the numerical solver and no longer behaves as an ODE flow, such as a time continuous dynamical system—it has become too discrete. The second ODE solver therefore verifies that the first ODE solver is configured to ensure that the neural ODE block is not dependent on the numerical method employed by the first ODE solver by checking to see whether the solution of the neural ODE block using a different numerical method or a different solver would yield the same, or sufficiently similar, solution. If the solutions obtained through the use of both solvers are sufficiently similar, then the neural ODE block is sufficiently discretised to behave as an ODE flow. In this case, it may be possible to adjust the accuracy parameter of the first ODE solver towards a coarser discretisation, which may reduce training time and computational resource requirements. If the solutions obtained through the use of both solvers differ significantly, then the neural ODE block has become dependent on the numerical solver. In this case, the accuracy parameter of the first ODE solver is adapted towards a finer discretisation.

In accordance with an example embodiment of the present invention, optionally, the neural network further comprises an upstream block and a downstream block, the upstream block being upstream from the neural ODE block and comprising at least one layer, and the downstream block being downstream from the neural ODE block and comprising at least one layer. The layer output upstream of the neural ODE block may be an output of the upstream block. Feeding the output of the first ODE solver downstream in the neural network may comprise feeding the output of the first ODE solver to the downstream block. Feeding the output of the second ODE solver downstream in the neural network may comprise feeding the output of the second ODE solver to the downstream block.

In accordance with an example embodiment of the present invention, optionally, a difference between the first performance value and the second performance value is determined, and the magnitude of the difference is compared to a threshold. Adjusting the accuracy parameter may comprise adjusting the accuracy parameter based on the comparison of the magnitude of the difference to the threshold.

In accordance with an example embodiment of the present invention, optionally, the performance function is a loss function, the first performance value is a first loss value, and the second performance value is a second loss value. Optionally, the performance function is an accuracy function, the first performance value is a first accuracy value, and the second performance value is a second accuracy value. The performance function quantifies a performance characteristic of the neural network with respect to a batch of training data. For example, the performance function may be a loss function, which provides an indication of the loss in a neural network during training. The loss function may be used to indicate how well the neural network is performing during the training. In another example, the performance function may be an accuracy function, which measures the accuracy of the neural network during training. For example, if the neural network is being trained as a classifier, the accuracy may be based on the proportion of correct predictions.

In accordance with an example embodiment of the present invention, optionally, the accuracy parameter is a tolerance, and adjusting the accuracy parameter based on the comparison of the magnitude of the difference to the threshold comprises, if the magnitude of the difference is greater than the threshold, increasing the tolerance of the first ODE solver, and if the magnitude of the difference is below the threshold, decreasing the tolerance of the first ODE solver.

In accordance with an example embodiment of the present invention, optionally, the accuracy parameter is a step size, and adjusting the accuracy parameter based on the comparison of the magnitude of the difference to the threshold may comprise, if the magnitude of the difference is greater than the threshold, decreasing the step size of the first ODE solver, and if the magnitude of the difference is below the threshold, increasing the step size of the first ODE solver. Optionally, increasing the step size may comprise multiplying the step size by a first predetermined value, the first predetermined value being greater than 1, and/or decreasing the step size may comprise multiplying the step size by a second predetermined value, the second predetermined value being between 0 and 1.

The magnitude of the difference being greater than the threshold indicates a drop in performance and a dependence on the numerical solver used to solve the ODE being approximated by the neural ODE block. Decreasing the tolerance of the first ODE solver, for example if the first ODE solver is an adaptive step size solver, provides a finer discretization, which trains the neural ODE block to behave as an ODE flow. Similarly, if the first ODE solver is a fixed step size solver, decreasing the step size provides a finer discretization and trains the neural ODE block to behave as an ODE flow. Increasing the tolerance, or analogously the step size, for example if the magnitude of the difference is below the threshold, may enable the training time to be reduced and the computational power and resources needed to train the neural network to be reduced, whilst still ensuring that the neural ODE block can be described by an ODE flow.

In accordance with an example embodiment of the present invention, optionally, the first ODE solver and the second ODE solver are fixed step size ODE solvers, and the second ODE solver is of convergence order higher than the first ODE solver. Optionally, the second ODE solver is selected to have an equal or smaller expected discretisation error than the first ODE solver. The second ODE solver being of higher convergence order than the first ODE solver typically results in the second ODE solver having a smaller discretisation error than the first ODE solver. The comparison between the performance value resulting from the use of the first ODE solver and the performance value resulting from the use of the second ODE solver can therefore be used to detect a performance drop due to the discretization imposed by the first ODE solver, and avoids a performance drop due to a coarse discretization from the second ODE solver.

In accordance with an example embodiment of the present invention, optionally, the neural network is an image classifier, the image classifier being configured to accept and image as an input and to classify the image into at least one of a plurality of classes.

In accordance with an example embodiment of the present invention, optionally, the accuracy parameter is adjusted periodically during the training, such as after a predefined number of iterations. Periodically adjusting the accuracy parameter has the effect of fine-tuning the accuracy parameter, which enables the method to train the neural network in such a way that the neural ODE block may be described by an ODE flow, whilst training time and the required computational cost are reduced.

In accordance with an example embodiment of the present invention, optionally, the accuracy parameter is adjusted aperiodically during the training. In some cases, it may be beneficial to adjust the accuracy parameter at irregular intervals. For example, near the beginning of training of the neural network, the accuracy parameter may be adjusted more frequently, in order to ensure that the neural network is trained using a first ODE solver which is sufficiently finely discretized.

In accordance with an example embodiment of the present invention, optionally, the adjusting of the accuracy parameter is repeated until the training of the neural network is ended. Adjusting the accuracy parameter as described above intermittently throughout the course of the training may ensure that the accuracy parameter of the first ODE solver is appropriate throughout the duration of the training, which improves the training of the neural network.

In accordance with an example embodiment of the present invention, optionally, the first ODE solver and/or the second ODE solver is based on at least one of a Runge-Kutta method, such as Euler's method, midpoint method, Heun's method, classic higher-order Runge Kutta method, Bogacki-Shampine method, and Ralston's method, and a multistep method, such as Adams-Bashforth method, Backward Differentiation Formulae, BDF, method or Adams-Moulton method. The second ODE solver may be based on a method used as an embedded higher-order solver. For example, if the first ODE solver is based on Euler's method, the second ODE solver may be based on the midpoint method. As a further example, if the first ODE solver is based on a second order Bogacki-Shampine method, the second ODE solver may be based on a third-order Ralston's method. In yet another example, the first ODE solver may be based on an Adams-Bashforth method, the second ODE solver may be based on the Adams-Moulton method.

In accordance with an example embodiment of the present invention, optionally, the method further comprises outputting model data representing the trained neural network. Outputting model data representing the trained neural network enables a neural network, trained via the method, to be obtained and used in order to perform a classification, decision and/or precision task.

In accordance with an example embodiment of the present invention, optionally, the method further comprises receiving an image as an input to the neural network and classifying the image into at least one of a plurality of classes. Image classification can be used in a wide variety of applications, such as in the field of autonomous vehicles, healthcare applications and robotics, such as in automated optical inspection.

In view of the disclosure herein, it will be appreciated by those skilled in the art that two or more of the abovementioned embodiments, implementations, and/or optional aspects of the present invention may be combined in any way deemed useful.

Modifications and variations of the computer-implemented method or any computer-readable medium, which correspond to the described modifications and variations of the system, can be carried out by a person skilled in the art on the basis of the present description, and vice versa.

BRIEF DESCRIPTIONS OF DRAWINGS

These and other aspects of the present invention are apparent from and will be elucidated with reference to the example embodiments described hereinafter.

Figure 2:
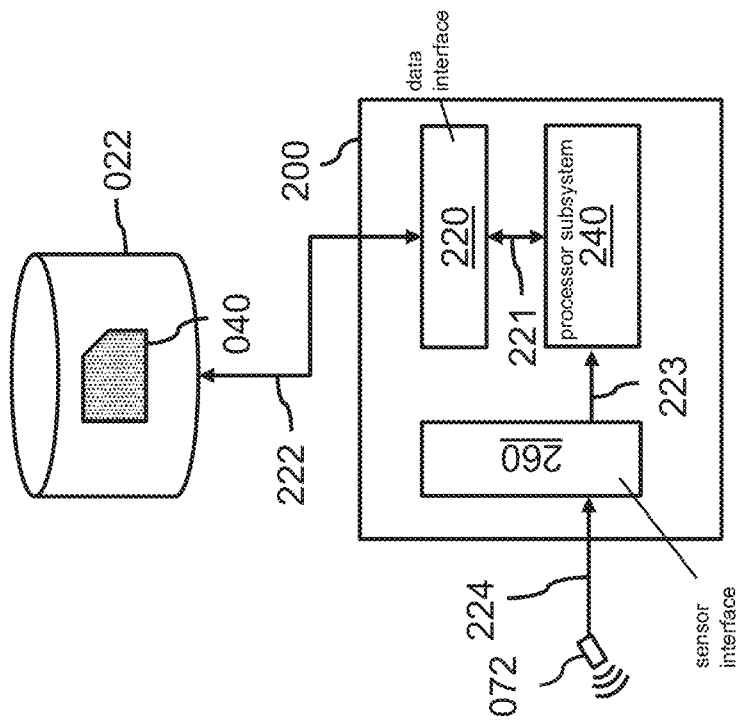
FIG. 2 shows a system for using a trained neural network comprising a neural ODE block according to an example embodiment of the present invention.

It should be noted that items which have the same reference numbers in different Figures, have the same structural features and the same functions, or are the same signals. Where the function and/or structure of such an item has been explained, there is no necessity for repeated explanation thereof in the detailed description.

REFERENCE SIGNS LIST

The following list of references signs is provided for facilitating the interpretation of the figures and shall not be construed as limiting the scope of the present invention.

021 a data storage
022 an external data storage
030 training data
040 model data defining a neural network
072 a sensor
100 a training system
120 a data interface 121 a data communication
122 access to a data storage
140 a processor subsystem
200 a system
220 a data interface
221 a data communication
222 access to external data storage
223 a data communication
224 sensor data
240 a processor subsystem
260 a sensor interface
410 a batch of training data
420 an upstream block of the neural network
430 a first ODE solver
435 a second ODE solver
440 a neural ODE block of the neural network
450 a downstream block of the neural network
460 a first output of the downstream block
465 a second output of the downstream block
470 a performance function
475 a second output of the performance function
480 a comparison function
600 a computer readable medium
610 data

DETAILED DESCRIPTION OF EXAMPLE EMBODIMENTS

The following relates to a method and system for training a neural network comprising a neural ordinary differential equation (ODE) block. A neural ODE block may be a section of a neural network or an entire neural network which is configured to approximate an ODE, using a neural ODE architecture. The training system and the resulting trained system are described with reference to FIGS. 1 and 2 respectively, while the computer-implemented method is described with reference to FIGS. 4a, 4b and 4c. The computer-implemented training method is described in detail with reference to FIG. 5. Throughout the following description, examples will be provided in the context of image classification, although it is to be understood that the present invention is not limited thereto—the present invention may be analogously applied to any regression tasks or to any application where feed-forward networks may be used. Although the examples provided throughout the description refer to a neural network with a single neural ODE block, it is to be understood that the neural network is not limited thereto. In some embodiments, the neural network may comprise a plurality of neural ODE blocks. In such embodiments, each neural ODE block may be trained in an analogous manner.

Since numerical solvers play an essential role in approximating the solutions of an ODE, it is important to understand how the choice of the numerical method affects the training of a neural ODE model. The inventors have found that if a trained neural ODE model corresponds to an ODE that is sufficiently well approximated by an applied discretization, then any discretization with similar or smaller discretization error should yield the same predictions. Since the solution of an ODE is agnostic to the type of numerical solver used to solve it, a neural ODE model should similarly be agnostic to the type of numerical ODE solver. Therefore, a second ODE solver may be used to ensure that the neural ODE model is trained to behave as an ODE flow during the training process, enabling the resulting trained network to have a valid ODE flow semantic. This behaviour can allow the trained neural network to benefit from the techniques and advances from the field of ODEs.

Figure 1:
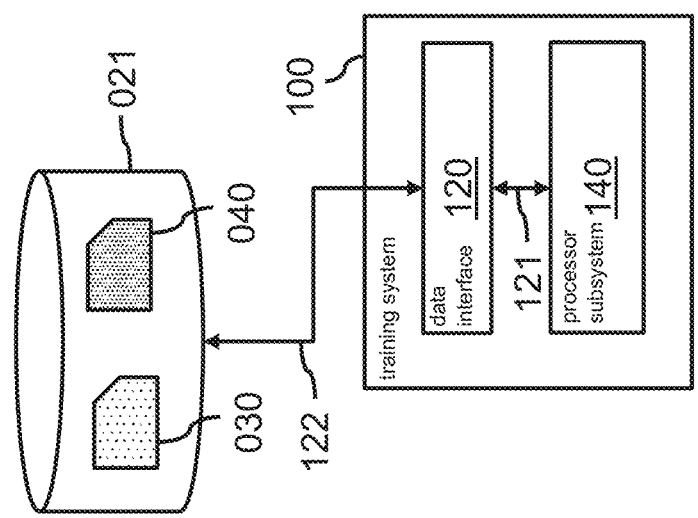
FIG. 1 shows a system for training a neural network comprising a neural ordinary differential equation (neural ODE) block according to an example embodiment of the present invention.

FIG. 1 shows a training system 100 for training a machine-learnable neural network according to an embodiment of the present invention. The neural network may comprise a neural ODE block. In some embodiments, the neural network may further comprise an upstream block and/or a downstream block. The neural ODE block refers to a block of the neural network parameterised to model an ODE flow. The upstream block refers to layer(s) of the neural network which are upstream of the neural ODE block, and the downstream block refers to layer(s) of the neural network which are downstream of the neural ODE block. In other words, the neural ODE block may be between the upstream block and the downstream block. For example, an input may be fed to the upstream block, the output of the upstream block may be fed to the neural ODE block, and the output of the neural ODE block may be fed to the downstream block. The output of the downstream block may be the output of the neural network. For example, if the neural network is trained to perform an image classification task, the output of the downstream block may be the resulting classification. In some embodiments, the neural network may not comprise either or both of a downstream block and an upstream block. In such cases, the input of the neural network may be directly input to the neural ODE block, and the output of the neural ODE block may be the output of the neural network.

The training system 100 may comprise a data interface 120 and a processor subsystem 140 which may be configured to communicate internally via data communication 121. The data interface 120 may enable access of model data 040 defining the model. The model data may comprise at least a set of parameters, such as weights of the neural network. The data interface 120 may further be used to enable access of a set of training data 030. In some embodiments, the model data 040 may be for use in making decisions, such as image classifications, such as by the trained system 200 of FIG. 2.

The processor subsystem 140 may be configured to, during operation of the training system 100 and using the data interface 120, access data 030, 040. For example, as shown in FIG. 1, the data interface 120 may provide access 122 to an external data storage 021 which may comprise said data 030, 040. Alternatively, the data 030, 040 may be accessed from an internal data storage which is part of the training system 100. Alternatively, the data 030, 040 may be received via a network from another entity. In general, the data interface 120 may take various forms, such as a network interface to a local or wide area network, e.g., the Internet, a storage interface to an internal or external data storage, etc. The data storage 021 may take any conventional and suitable form.

The processor subsystem 140 may obtain a set 030 of training data. The training dataset may comprise a plurality of training data elements. The training data 030 may comprise one or more batches of training data, each of which may comprise a plurality of training data elements. Each training data element may comprise, in some embodiments, an input, such as an input image, and a corresponding ground truth, such as a ground truth classification. The input may, in some embodiments, be obtained from a sensor communicatively coupled to the neural network. In the figure, the training dataset is accessed via data interface 120, but this is not needed, e.g., training data may be measured during training.

The processor subsystem 140 may train the neural network based on the training dataset 030. The neural network may be trained using a first ODE solver and a second ODE solver, the second ODE solver employing a different numerical ODE solving method than the first ODE solver. Training the neural network may comprise determining weights of the neural network, in which the first ODE solver is applied to the neural ODE block, by optimising a performance function according to any conventional optimisation technique. In a forward pass during a typical training iteration, a performance value, that is, a value that can be used to indicate performance, may be obtained by:

- inputting or feeding a training element (e.g., an input image, or an input instance) into the neural network. More specifically, the training element may be input into an input layer of the upstream block of the neural network.
- feeding the output of the upstream block to the first ODE solver;
- applying the first ODE solver to the neural ODE block;
- feeding the output of the first ODE solver to the downstream block; more specifically, feeding the output of the first ODE solver to a layer downstream of the neural ODE block;
- feeding the output of the downstream block (e.g., all of the layers of the neural network that are downstream of the neural ODE block) to the performance function;
- inputting the ground truth of the training element to the performance function;
- calculating a performance value using the performance function, based on a comparison of the output of the downstream block and the ground truth.

In embodiments in which the neural network does not include the upstream block and the downstream block, or of the neural ODE block and one of the upstream block and the downstream block, the method for obtaining a performance may be adjusted. For example, inputting the training element into the neural network may instead comprise feeding the training element directly to the neural ODE block via an input layer. Similarly, the output of the first ODE solver may be used as the output of the downstream block.

In many cases, a loss value may be calculated. In some embodiments, the performance function may be a loss function, which determines a loss value based on the output of the downstream block and the ground truth. In some embodiments, a loss function is used in addition to the performance function. For example, the performance function may be an accuracy function. In this case, a loss function may additionally be used for training weights and parameters of the upstream and/or downstream blocks. Based on the loss value, the parameters and/or weights of the neural network may be adapted.

However, during the training of a neural ODE block, the neural network, which may describe a vector field of the ODE, is not trained directly. Instead, the numerical solution where the neural network is evaluated at discrete points in time, is optimised. To this end, the second ODE solver may be used in order to ensure that the neural network is being trained to sufficiently correspond to an ODE flow. Occasionally during the training, either periodically or aperiodically, for example according to a schedule, the second ODE solver may be applied to the neural ODE block, and two performance values may be obtained and compared. Since the solution of the neural ODE block should be agnostic to the type of solver used if the neural ODE block can be described by an analytical ODE flow, the output of the performance function obtained when the first ODE solver is used and the output of the performance function obtained when the second ODE solver is used should not differ by a significant margin. If this is not the case, it follows that the neural ODE is no longer agnostic to the type of solver used, and therefore cannot be described by an ODE flow. In such a case, the techniques and methods derived from the field of ODEs may not be suitable.

A difference may be used to express the extent to which the first performance value differs from the second performance value. That is, the difference may be determined through any comparative means or function which indicates a level of difference or similarity between the two values. The difference may also be referred to as a result of a comparison. A difference between the output of the performance function obtained when the first ODE solver is used and the output of the performance function obtained when the second ODE solver is used may be quantified in various ways, for example by subtracting one output from another, by determining a distance between the outputs, such as a Euclidean distance, or by determining a ratio between the outputs by dividing one output by the other or the like. In some embodiments, the magnitude of a difference, such as a subtraction operation, may be used. In other embodiments, it may be sufficient to ensure that the second performance value indicates an equal or better performance than that indicated by the first performance value. The difference may be indicative of whether there is a performance drop due to the use of the first ODE solver, which itself is indicative that the neural ODE block is not being trained to adequately approximate an ODE flow. The difference may for example be compared to a threshold, e.g., after determining the magnitude of the difference, to determine whether to adjust the accuracy parameter.

If the magnitude of the difference exceeds a threshold, an accuracy parameter of the first ODE solver is adjusted.

In some embodiments, the accuracy parameter is a step size, such as when the first ODE solver is a fixed step solver. If the difference exceeds the threshold, then the step size may be increased. In some embodiments, if the difference is less than the threshold, or if the difference is less than or equal to the threshold, the step size may be decreased.

In some embodiments, the accuracy parameter is a tolerance, such as when the first ODE solver is an adaptive step solver. If the difference exceeds the threshold, then the tolerance may be decreased. In some embodiments, if the difference is less than, or less than or equal to, the threshold, the tolerance may be increased.

This process will be described in detail with reference to FIG. 4b.

As an optional component, the training system 100 may comprise a sensor interface (not shown) for obtaining, from one or more sensors, sensor data. Based on this sensor data, a measurement may be used as a training data element for training the neural network. For example, the measurement may comprise or be based on one or more sensor readings. Sensor interfaces are also described with respect to FIG. 2.

Various details and aspects of the operation of the training system 100 will be further elucidated with reference to FIG. 4, including optional aspects thereof.

In general, the training system 100 may be embodied as, or in, a single device or apparatus, such as a workstation, e.g., laptop or desktop-based, or a server. The device or apparatus may comprise one or more microprocessors which execute appropriate software. For example, the processor subsystem may be embodied by a single Central Processing Unit (CPU), but also by a combination or system of such CPUs and/or other types of processing units. The software may have been downloaded and/or stored in a corresponding memory, e.g., a volatile memory such as RAM or a non-volatile memory such as Flash. Alternatively, the functional units of the system, e.g., the data interface and the processor subsystem, may be implemented in the device or apparatus in the form of programmable logic, e.g., as a Field-Programmable Gate Array (FPGA) and/or a Graphics Processing Unit (GPU). In general, each functional unit of the training system 100 may be implemented in the form of a circuit. It is noted that the training system 100 may also be implemented in a distributed manner, e.g., involving different devices or apparatuses, such as distributed servers, e.g., in the form of cloud computing.

FIG. 2 shows a system 200 for using a trained neural network according to an example embodiment of the present invention. The trained neural network may comprise a neural ODE block. The trained neural network may further comprise an upstream block and/or a downstream block. The upstream block may be used to refer to layers of the neural network which are upstream of the neural ODE block, whilst the downstream block may be used to refer to layers of the neural network which are downstream of the neural ODE block. The system 200 may be communicatively coupled to a computer-controlled entity operating in an environment. For example, the computer-controlled entity may be an autonomous vehicle, robot or other device. The environment of the computer-controlled entity may refer to the physical environment, e.g., surroundings, of the computer-controlled entity.

The system 200 may comprise a data interface 220 and a processor subsystem 240 which may be configured to internally communicate via data communication 221. Data interface 220 may be for accessing model data 040 defining the neural network. The model data may comprise at least a set of parameters (e.g., weights) of the neural network. The neural network may be trained according to a training method as described herein, e.g., by training system 100 of FIG. 1. The system 200 may also be configured to train the neural network in addition to applying it, e.g., system 200 may be combined with training system 100 of FIG. 1.

The processor subsystem 240 may be configured to, during operation of the system 200 and using the data interface 220, access data 040. For example, as shown in FIG. 2, the data interface 220 may provide access 222 to an external data storage 022 which may comprise said data 040. Alternatively, the data 040 may be accessed from an internal data storage which is part of the system 200. Alternatively, the data 040 may be received via a network from another entity. In general, the data interface 220 may take various forms, such as a network interface to a local or wide area network, e.g., the Internet, a storage interface to an internal or external data storage, etc. The data storage 022 may take any conventional and suitable form.

The processor subsystem 240 may be configured to, during operation of the system 200 and using the data interface 220, obtain the trained model and data, such as sensor data, and perform a decision-based task, for example a classification task, using the neural ODE block of the neural network.

In some examples, the processor subsystem 240 may be configured to perform a classification task, such as an image classification, in which an input instance, such as an image, is obtained, for example via sensor interface 260, and classified according to an ODE modelled by the neural ODE block. Based on the classification obtained for the input instance, the system 200 may control a communicatively coupled entity accordingly.

As an optional component, the system 200 may comprise a sensor interface 260 for obtaining, from one or more sensors, sensor data 224 indicative of a state of the computer-controlled entity. As a non-limiting example, a single sensor 072 is shown in the figure. Sensor interface 260 may internally communicate with processor subsystem 240 via data communication 223. Generally, the sensor data 224 may comprise measurements of one or more physical quantities of a computer-controlled entity communicatively coupled to system 200 and/or an environment of the computer-controlled entity, e.g., of a device being controlled and/or an environment with which the device interacts.

The sensor interface 260 may be configured for various types of sensor signals, e.g., measurements of various physical quantities such as temperature, pressure, light intensity, motion, acceleration, and various signals based on which such various physical quantities may be determined, e.g., video signals, radar/LiDAR signals, ultrasonic signals, etc. The sensor(s) 072 can be arranged in the computer-controlled entity, but remote sensing is also possible. Sensor interface 260 may also access the sensor data from elsewhere, e.g., from a data storage or a network location. Sensor interface 260 may have any suitable form, including but not limited to a low-level communication interface, e.g., based on 120 or SPI data communication, but also a data storage interface such as a memory interface or a persistent storage interface, or a personal, local or wide area network interface such as a Bluetooth, Zigbee or Wi-Fi interface or an ethernet or fiberoptic interface. Sensor 072 may be included in system 200.

As an optional component, the system 200 may comprise a display output interface or any other type of output interface (not shown) for outputting one or more determined classifications or decisions to a rendering device, such as a display. For example, the display output interface may generate display data for the display causing the display to render the one or more classifications or decisions in a sensory perceptible manner, e.g., as an on-screen visualisation.

The determined classifications, predictions and/or decisions can be used for training and/or controlling a computer-controlled system. For example, this computer-controlled system can be system 200 itself, or system 200 may communicate with an external computer-controlled system for training and/or controlling it, e.g., by providing a determined classification or decision; or by determining and providing an interaction policy or control command based on the classification or decision.

For example, system 200 may be a computer-controlled system for interacting with an environment, e.g., a robotics system. The system 200 may comprise an actuator interface (not shown). The actuator interface may be for providing, to an actuator, actuator data causing the actuator to effect an action in the environment. For example, the actuator may be an electric, hydraulic, pneumatic, thermal, magnetic and/or mechanical actuator. Specific yet non-limiting examples include electrical motors, electroactive polymers, hydraulic cylinders, piezoelectric actuators, pneumatic actuators, servomechanisms, solenoids, stepper motors, etc. Processor subsystem 240 may be configured to determine the actuator data based on a determined classification or decision, e.g., in order to move a robot arm into a desired location. The actuator can be part of system 200.

System 200 can also be in communication with an external computer-controlled system for training and/or controlling it. For example, system 200 can be a subsystem of a vehicle, and the neural network can correspond to a model of a mechanical component of the vehicle. System 200 can in this case for example provide the determined classification or decision to another subsystem of the vehicle for controlling the vehicle based on the determined classification or decision. Or, system 200 can itself determine a control signal for controlling the vehicle based on the decision or classification. Many variations will be envisaged by the skilled person.

In general, the system 200 may be embodied as, or in, a single device or apparatus, such as a workstation, e.g., laptop or desktop-based, or a server. For example, the system 200 may be an embedded computer, such as part of a control system of the computer-controlled entity, e.g., built into an autonomous vehicle or robotic agent. The device or apparatus may comprise one or more microprocessors which execute appropriate software. For example, the processor subsystem may be embodied by a single Central Processing Unit (CPU), but also by a combination or system of such CPUs and/or other types of processing units. The software may have been downloaded and/or stored in a corresponding memory, e.g., a volatile memory such as RAM or a non-volatile memory such as Flash. Alternatively, the functional units of the system, e.g., the data interface and the processor subsystem, may be implemented in the device or apparatus in the form of programmable logic, e.g., as a Field-Programmable Gate Array (FPGA) and/or a Graphics Processing Unit (GPU). In general, each functional unit of the system may be implemented in the form of a circuit. It is noted that the system 200 may also be implemented in a distributed manner, e.g., involving different devices or apparatuses, such as distributed servers, e.g., in the form of cloud computing.

The use of neural ODEs or neural ODE blocks within neural networks allows the plethora of tools and techniques developed in the field of ODE research to be applied to neural networks. However, to enable the theoretical advantages of neural ODEs to be enjoyed, it is important that the neural network is a sufficiently close approximation of the true analytical ODE solution, which is often inaccessible.

In order to assess whether the approximation is sufficiently close to the analytical ODE solution, a performance function such as a loss function may be used. For the sake of illustration, the method will be described with reference to the empirical risk minimization (ERM) problem as defined below. Any loss function (represented by l) may be used, such as an L2 loss, cross-entropy error or the like.

$$L_{\mathcal{D}} = \frac{1}{|\mathcal{D}|} \sum_{(x,y) \in \mathcal{D}} l(f(x; w), y)$$

where:

$\mathcal{D} = \{(x_n, y_n) | x_n \in \mathbb{R}^{\mathcal{D}_x}, y_n \in \mathbb{R}^{\mathcal{D}_y}, n=1, \ldots, N\}$ is a set of training data, $l: \mathbb{R}^{\mathcal{D}_y} \times \mathbb{R}^{\mathcal{D}_y} \to \mathbb{R}$ is a non-negative loss function, and f is a neural ODE model (e.g., a neural network comprising a neural ODE block) with weighs w, as shown below:

$$f = f_d \circ \varphi_T^{f_v} \circ f_u$$

where $f_x$, $x \in \{d, v, u\}$ are neural networks and u and d denote the upstream and downstream layers respectively. That is, $f_u$ denotes the layers of the neural network which are upstream of the neural ODE block, and $f_d$ denotes the layers of the neural network which are downstream of the neural ODE block.

φ is defined to be the analytical flow of the dynamical system:

$$\frac{dz}{dt} = f_v(z; w_v), z(t) = \varphi_t^{f_v}(z(0))$$

As the vector field $f_v$ of the dynamical system is itself defined by a neural network, or a neural network block, evaluating $\varphi_T^{f_v}$ is intractable and a numerical scheme $\Psi_t$ is used to compute $\varphi_t$. $\Psi$ may belong to a class of fixed step size $h=TK^{-1}$ methods or may be an adaptive step size solver. For each initial value problem (IVP) of the neural ODE $z_n(0)=f_u(x_n)$, the trajectory computed using a particular solver $\Psi$ is defined as $z_{n,k}=\Psi_h(z_{n,k-1})$, $k=1, \ldots, K$ where K is uniquely defined for fixed-step solvers.

Although the above description refers to a loss function, the present invention is not limited thereto. In some embodiments of the present invention, the performance function may be an accuracy function, and the performance value may be an accuracy value. That is, the loss function used to train the neural network (e.g., the upstream block and/or the downstream block) may be accompanied by a different performance function, such as the accuracy function. This may be applicable in classification neural networks, for example.

In other words, the neural network may be trained by optimizing a loss function, e.g., using the empirical risk minimization problem described above, in an iterative fashion. At various points during the training, e.g., periodically after a defined number of iterations, the parameters of the first ODE solver may be adjusted by comparing the performance of the neural network when using the first ODE solver to the performance of the neural network when using the second ODE solver. For example, the training of the neural network, e.g., the updating of parameters and weights in the upstream block and the downstream block, may proceed for 49 iterations, and on the 50th iteration, the accuracy parameter of the first ODE solver may be adjusted according to the method described herein. The training of the neural network, e.g., updating the parameters and weights of the upstream block and the downstream block, may then repeat for another given number of iterations, and in the next iteration, the accuracy parameter of the first ODE solver may again be assessed by comparing the performance values, and adjusted. This process may be repeated, for example until training ends.

It may also be possible to measure the performance of the neural network by calculating an accuracy value by using an accuracy function. This may be applicable, for example, in classification neural networks. The accuracy value may be defined as the number of correct predictions over the total number of predictions. In machine learning, the output of a neural network used for classification tasks is commonly a vector containing values for each of a plurality of classes. For example, if the classification neural network is trained to classify an input into one (or more) of five classes, the vector may have the format (0.1, 0.2, 0.5, 0.1, 0.1). This vector may be converted such that the largest entry is converted to 1 whilst the other entries are converted to 0. In the example above, the vector provided would be converted to (0, 0, 1, 0, 0). This vector may then be compared to a second vector encoding the true class (e.g., the ground truth). If the two vectors agree, then the prediction is correct. This process may be repeated for each training element in a batch of training data. The accuracy may thus be calculated as the ratio of correct predictions to overall predictions. It is to be understood that the accuracy function and the resulting accuracy value indicates the accuracy of the neural network. The accuracy parameter of the first ODE solver, however, is a parameter of the first ODE solver, and should not be confused with the accuracy function and resulting accuracy value of the neural network.

In other embodiments of the present invention, the performance values may be the outputs of the respective ODE solvers. In other words, comparing the performance of the neural network using the first ODE solver to the performance of the neural network using the second ODE solver may comprise comparing the outputs of the first ODE solver and the second ODE solver directly.

In the training process of a neural ODE model (e.g., a neural network comprising a neural ODE block), the neural network describing the vector field of the ODE is not trained directly. Instead, the numerical solution where the neural network is evaluated at discrete points in time is optimised.

Since the numerical solvers play an important role in the approximation of solutions of an ODE, the effect of the choice of numerical method on the training of a neural ODE model should be considered. In particular, the discretisation step of the numerical solver may have an impact on the resulting flow of the ODE. This impact is illustrated by the graphs of FIGS. 3a and 3b.

Figure 3B:
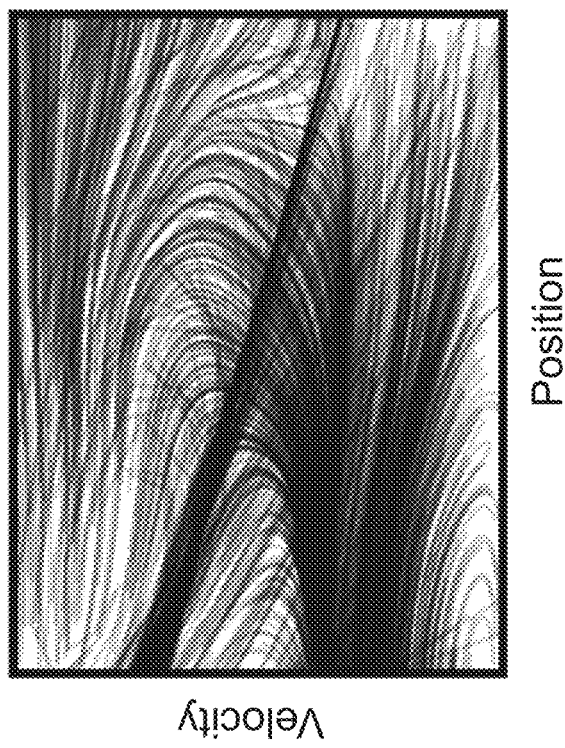
FIG. 3b shows a graph of numerically computed trajectories of initial value problems of a neural ODE model trained with a large step size.
Figure 3A:
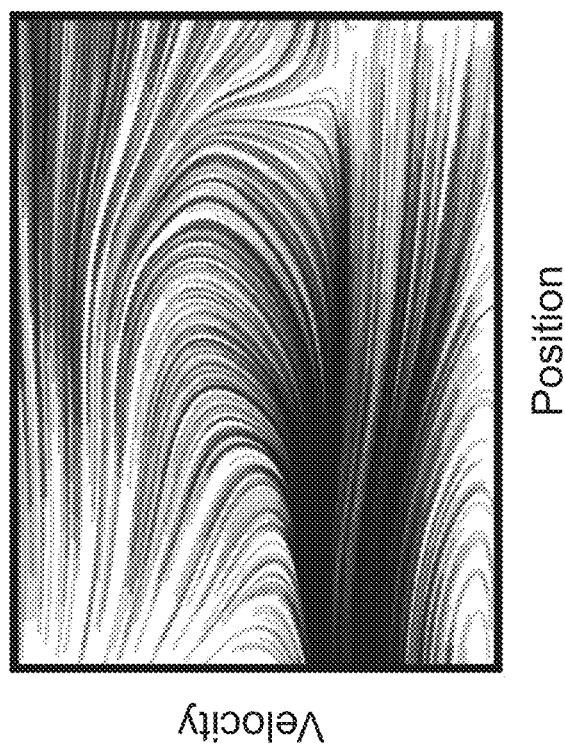
FIG. 3a shows a graph of numerically computed trajectories of initial value problems of a neural ODE model trained with a small step size.

FIG. 3a shows a graph of numerically computed trajectories of initial value problems of a neural ODE model trained with a small step size. FIG. 3a shows that when a fixed step size ODE solver with a small step size is used to train the neural network, the numerically computed trajectories of the individual IVPs do not cross, which is an indication that the learned flow approximates the true solution of an ODE.

FIG. 3b shows a graph of numerically computed trajectories of initial value problems of a neural ODE model trained with a large step size. Conversely to FIG. 3a, FIG. 3b shows that if a fixed step size ODE solver with a large step size is used to train the neural network, the trajectories of the IVPs do cross. This behaviour indicates that the numerical solutions for solvers with large step sizes do not always agree with the true solutions of the ODE. The discretisation error of such a solver is so large that the resulting numerical solution no longer maintains the properties of the ODE solutions.

Although the description of FIGS. 3a and 3b refer to the use of fixed step size ODE solvers, it is to be understood that this is analogous to the use of adaptive step size ODE solvers. In the case of adaptive step size ODE solvers, however, a tolerance may be varied rather than the step size. For example, the trajectories of the IVPs would not cross when a sufficiently low tolerance is used by the adaptive step size ODE solver used to train the neural network, whilst the trajectories of the IVPs would cross when the tolerance of the adaptive step size ODE solver used to train the neural network is high.

Both the tolerance and the step size are examples of accuracy parameters.

The graphs of FIGS. 3a and 3b illustrate that, when the ODE solver has a sufficiently small step size, or analogously a sufficiently low tolerance, the neural network exhibits the same behaviour as the true analytical solution of the ODE, and when the step size or tolerance of the ODE solver is too high, the behaviour of the neural network no longer corresponds to that of the true analytical solution of the ODE. That is, at a large step size or high tolerance of the ODE solver, the solution becomes dependent on the choice of ODE solver. Therefore, if the neural network is trained with an ODE solver with a sufficiently small step size or sufficiently low tolerance, testing the neural network with another ODE solver with a smaller step size or lower tolerance should achieve the same or similar accuracy. However, if the ODE solver used to train the neural network has a step size or tolerance that is too large, a comparison of performance with another ODE solver with a smaller step size or lower tolerance will indicate a discrepancy. That is, a sharp drop in test performance may be observed.

By testing the neural network with a second ODE solver, different from the ODE solver used to train the neural network, and comparing the performance of the neural network resulting from each of the ODE solvers, it becomes possible to determine a step size at which the ODE interpretation becomes valid (e.g., exhibits the behaviour of an ODE flow without dependence on the choice of numerical solver). Whilst the use of very small step sizes and very low tolerances may be more likely to train the neural network to approximate the ODE appropriately, unnecessarily small step sizes or low tolerances may require additional computation, and therefore training, time, and may also require additional computational power and resources. It is therefore desirable to identify a step size or tolerance which is as large as possible but which still trains the neural network to approximate the ODE as an ODE flow. The description of FIGS. 4a and 4b below relate to a computer-implemented method for training the neural network based on these principles.

Figure 4A:
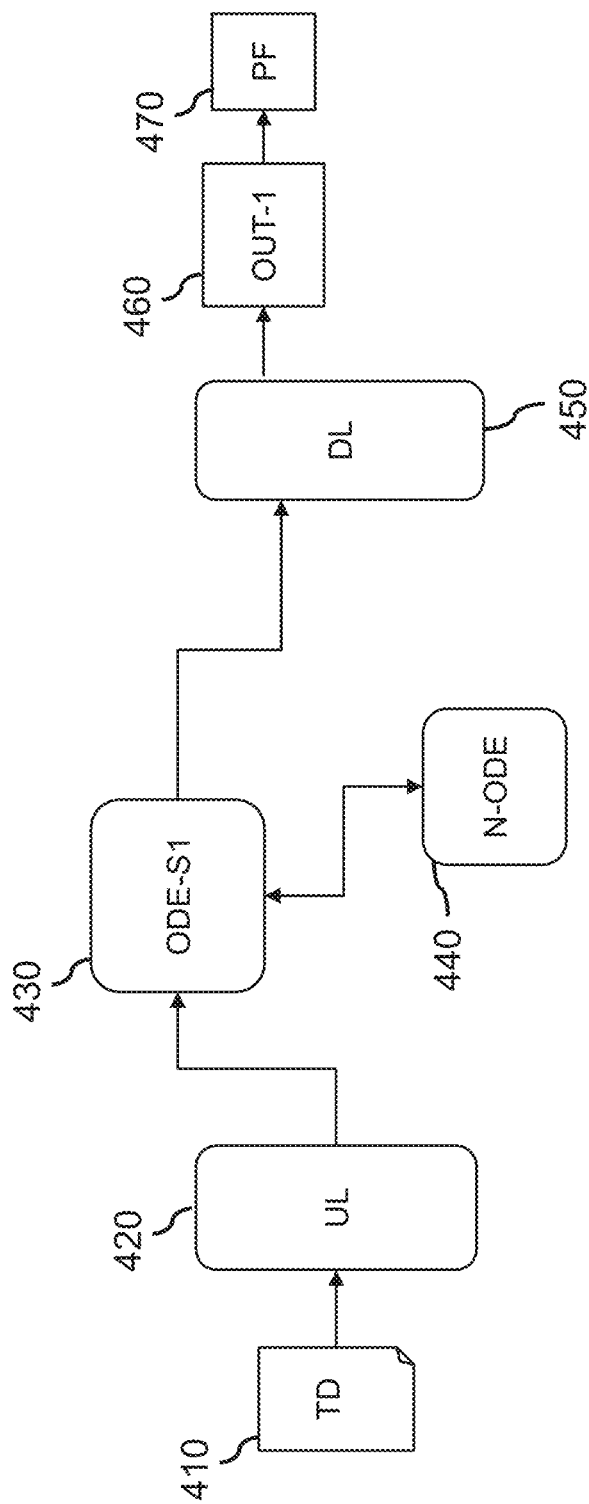
FIG. 4a shows a detailed example of training a neural network comprising a neural ODE block, in accordance with an example embodiment of the present invention.

FIG. 4a shows a detailed example of training a neural network comprising a neural ODE block. The neural network may further comprise an upstream block and/or a downstream block. More specifically, FIG. 4a shows a forward pass of an iteration of training. An element, or a batch, or training data TD 410 is fed into the upstream layers UL 420 of the neural network, e.g., the layers of the neural network which are upstream of the neural ODE block, N-ODE 440. The output of the upstream layers UL 420 is then fed into the first ODE solver, ODE-S1 430. In some embodiments, as will be demonstrated in FIG. 4c, there may be no upstream block between the input of the training data and neural ODE block. In such embodiments, the training data TD 410 may be input directly to the first ODE solver, ODE-S1 430, e.g., via an input layer, which is an example of an upstream layer. The first ODE solver, ODE-S1 430 may be initialised with an accuracy parameter. The accuracy parameter may be a step size, for example if the first ODE solver is a fixed step size ODE solver, or a tolerance, for example if the first ODE solver is an adaptive step size ODE solver. The first ODE solver, ODE-S1 430, is then applied to the neural ODE block, N-ODE 440. The output of the application of the first ODE solver, ODE-S1 430 to the neural ODE block, N-ODE 440, is then fed to the downstream layers DL 450 of the neural network. The downstream layers DL 450 of the neural network comprise the layers of the neural network which are downstream from the neural ODE block, N-ODE 440. The output of downstream layer DL 450 is referred to as the first output, OUT-1, 460, and is fed into the performance function PF 470. In some embodiments, as will be demonstrated in FIG. 4c, there may be no downstream block between the neural ODE block and the output of the neural network. That is, the output of the neural ODE block may be the output of the neural network, OUT-1 460, e.g., via an output layer. An output layer is an example of a downstream layer. Typically, the performance function PF 470 is optimised over the course of many iterations of training, by adjusting parameters and weights of the neural network, including parameters and weights of each of the upstream layers UL 420, the downstream layers 450 and the neural ODE block N-ODE 440. For example, the performance function PF 470 may be one of a loss function, an accuracy function, a direct output of the neural ODE block or a direct output of the neural network.

Although represented in FIG. 4a as independent blocks, the neural ODE block N-ODE 440 may comprise the first ODE solver, ODE-S1 430 in some embodiments.

Figure 4B:
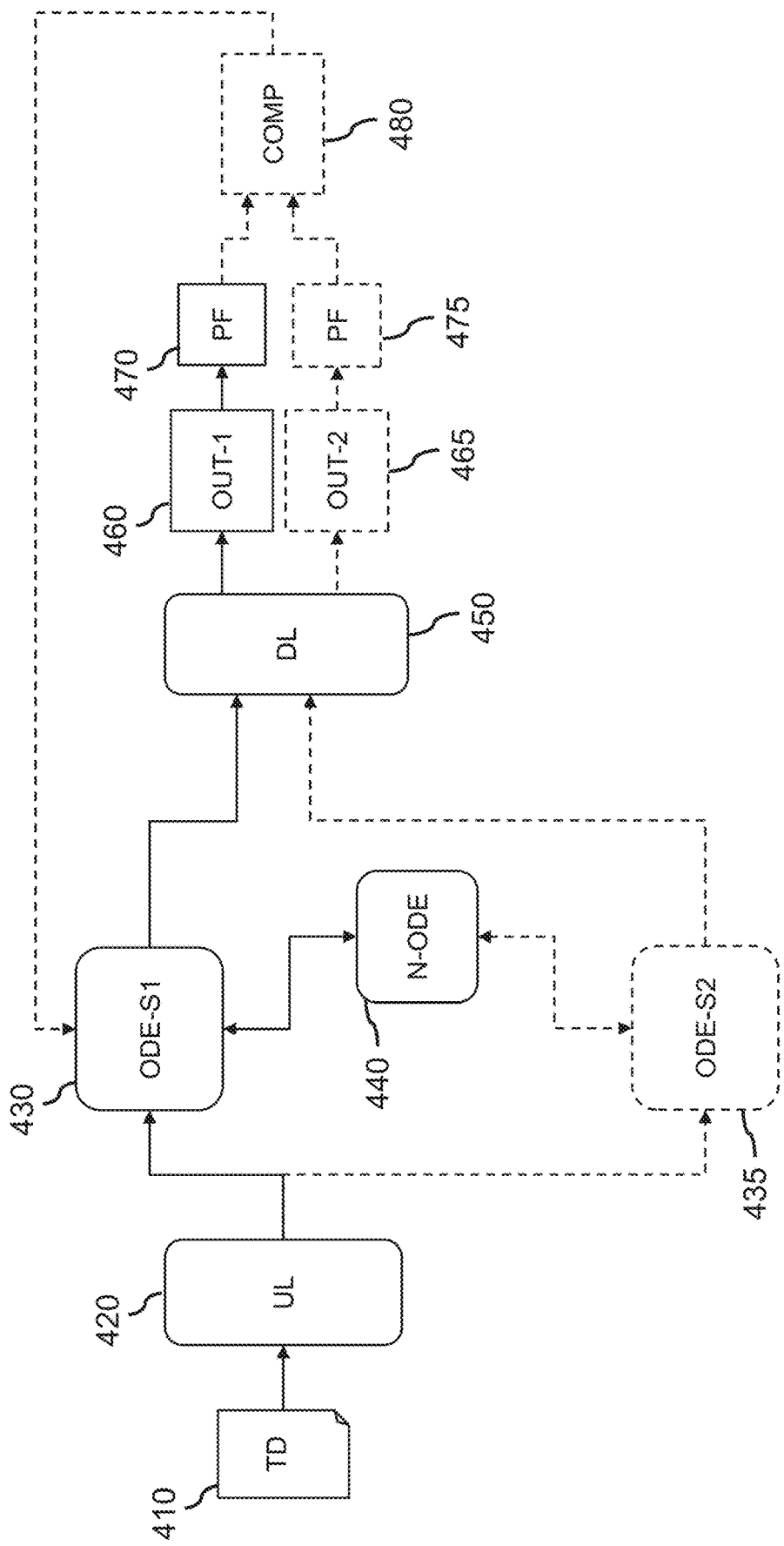
FIG. 4b shows a detailed example of training a neural network comprising a neural ODE block according to an example embodiment of the present invention.

In order to illustrate training the neural network using the above-described principles, FIG. 4b is shown, which differs from FIG. 4a by the elements marked in dashed lines.

Intermittently during the training, the forward pass of an iteration of training is adapted to also use a second ODE solver. The second ODE solver may, in some embodiments, be included in the neural ODE block, or may be external thereto. FIG. 4b illustrates the adapted forward pass of the training iteration.

As described with reference to FIG. 4a, a batch of training data TD 410 is input into the upstream layers UL 420. The upstream layers UL 420 may also be referred to as the upstream block. The output of the upstream block UL 420 is then fed into both the first ODE solver ODE-S1 430 and the second ODE solver ODE-S2 435. The output of the upstream block UL 420 may be fed, or provided, into both solvers ODE-S1, ODE-S2 simultaneously or sequentially, in any order. The output of the upstream block is an example of a layer output upstream of the neural ODE block.

In addition to the forward pass as described with reference to FIG. 4a and denoted by the solid arrows, the additional aspect denoted by the dashed lines and arrows are described presently. The combination of the forward pass denoted by the solid lines and arrows and the additional aspect denoted by the dashed lines and arrows may be referred to as the adapted forward pass. Each of the first ODE solver ODE-S1 430 and the second ODE solver ODE-S2 435 are applied to the neural ODE block N-ODE 440 independently.

Each of the first ODE solver ODE-S1 430 and the second ODE solver ODE-S2 435 may independently pass their respective outputs to the downstream layers DL 450. The downstream layers DL 450 may be collectively referred to as the downstream block.

The output of the second ODE solver ODE-S2 435 is processed and handled by the downstream block DL 450 independently from the output of the first ODE solver ODE-S1 430. In some embodiments, the output of the second ODE solver ODE-S2 435 is fed to the downstream block DL 450 sequentially before or after the output of the first ODE solver ODE-S1 430, or both the outputs of the first ODE solver ODE-S1 430 and of the second ODE solver ODE-S2 435 may be passed to the downstream block DL 450 simultaneously, although processed completely independently. In some embodiments, the downstream block may be replicated such that the output of the second ODE solver ODE-S2 435 is fed to the replicated downstream block DL 450 in a manner completely independent from the processing of the output of the first ODE solver ODE-S1 430.

A first output from the downstream block DL 450 is denoted OUT-1 460 as described with reference to FIG. 4a. The first output OUT-1 460 is the result of the output from the first ODE solver ODE-S1 430 being fed into the downstream block DL 450. A second output from the downstream block DL 450 is denoted OUT-2 465. The second output OUT-2 465 is the result of the output from the second ODE solver ODE-S2 435 being fed into the downstream block DL 450. The first output OUT-1 460 and the second output OUT-2 465 are independently obtained via the downstream block DL 450.

Each of the first output OUT-1 460 and the second output OUT-2 465 may be input into a performance function. The first output OUT-1 460 may be fed into performance function PF 470. The second output OUT-2 465 may be fed into performance function PF 475. Performance functions PF 470 and 475 may be identical performance functions, and are represented as distinct functions in the diagram of FIG. 4b to highlight that the performance functions, although preferably identical in form, are independently applied to each of the outputs OUT-1 460 and OUT-2 465, and produce distinct performance values. In other words, a first performance value is obtained from performance function PF 470, which is applied to the first output OUT-1 460 of the downstream block DL 450. The first performance value corresponds to the use of the first ODE solver ODE-S1 430. The second performance value corresponds to the use of the second ODE solver ODE-S2 435. In other words, the first performance value represents the performance obtained when the first ODE solver ODE-S1 430 is applied to the neural ODE block N-ODE 440. The second performance value represents the performance obtained when the second ODE solver ODE-S2 435 is applied to the neural ODE block N-ODE 440. The performance function PF 470, 475 may be a loss function, an accuracy function, or the like, as described above.

In some embodiments of the present invention, the first output OUT-1 460 and the second output OUT-2 465 may be considered to be the first performance value and the second performance value, respectively. In such cases, the performance function PF 470, 475 may correspond to a capturing the first output OUT-1 460 and the second output OUT-2 465. For example, a performance drop may be detected if the first output OUT-1 460 differs significantly (e.g., by more than a threshold) from the second output OUT-1 465. For example, if the distance between the first output OUT-1 460 and the second output OUT-2 465 is large (e.g., above a threshold), then the accuracy parameter of the first ODE solver may be adjusted, for example by decreasing the step size or decreasing the tolerance.

The first performance value and the second performance value are then compared in block 480. The comparison of the first performance value and the second performance value may comprise determining a difference between the first performance value and the second performance value. In some embodiments, the accuracy parameter of the first ODE solver ODE-S1 430 may be adjusted based on whether the magnitude of the difference between the first performance value and the second performance value exceeds a threshold. Determining the difference between the first performance value and the second performance value may comprise subtracting the first performance value from the second performance value (or vice versa), dividing the first performance value by the second performance value (or vice versa), determining a distance between the first performance value and the second performance value (e.g., a Euclidean distance) or the like. For example, if the first performance value is similar to the second performance value, the quotient thereof should be close to 1.

For example, if the magnitude of the difference between the first performance value and the second performance value exceeds the threshold, then a drop in performance is observed. To address this drop in performance and to adapt the first ODE solver ODE-S1 430 to improve its discretization, the step size may be decreased or a tolerance may be decreased. In embodiments in which the first ODE solver ODE-S1 430 is a fixed step size solver, the step size of the first ODE solver may be decreased. Decreasing the step size results in a finer discretisation, which may be needed to obtain an approximation to the ODE flow. For example, the step size of the first ODE solver may be decreased by a predetermined percentage. The current step size may be multiplied by a number between 0 and 1 to obtain a new step size. In embodiments in which the first ODE solver ODE-S1 430 is an adaptive step size solver, the tolerance of the first ODE solver may be decreased. The tolerance of an ODE solver refers to the allowable estimated error which is used to adapt the step size in an adaptive step size ODE solver. As the tolerance increases, the size of the allowable error also increases, allowing for larger step sizes to be used. In the inverse case, as the tolerance is decreased, the size of the allowable decreases and smaller step sizes are used. Having smaller step sizes means using more steps (e.g., a higher number of steps), which decreases the resulting error.

Adaptive step size solvers may be parameterised by an error weighting function or a tolerance.

The tolerance may be adjusted by, for example, simultaneously adjusting a relative tolerance and an absolute tolerance. In some embodiments, adjusting the tolerance of an adaptive step size solver may comprise adjusting the error weighting function.

In some embodiments of the present invention, when the first ODE solver and the second ODE solver are adaptive step size solvers, the tolerance of the second ODE solver may be set based on the tolerance of the first ODE solver. For example, the tolerance of the second ODE solver may be a fraction of the tolerance of the first ODE solver. More specifically, the relative tolerance of the second ODE solver may be set to be a fraction of the relative tolerance of the first ODE solver and the absolute tolerance of the second ODE solver may be set to be a fraction of the absolute tolerance of the first ODE solver.

If the magnitude of the difference between the first performance value and the second performance value falls below a threshold, or in some embodiment also when the magnitude of the difference equals the threshold, the accuracy parameter may be decreased. Having the magnitude of the difference fall within the threshold indicates that the neural ODE block N-ODE 440 is approximating the analytical ODE flow and is independent of the numerical solver used to solve it. In such a case, it may be possible to increase the accuracy parameter in order to reduce the time required for training and/or reduce the computational power and resources needed for training. For example, if the first ODE solver ODE-S1 430 is a fixed step size ODE solver, the step size may be increased. For example, the current step size of the first ODE solver ODE-S1 430 may be multiplied by a number greater than 1 to obtain a new step size. In some embodiments, if the first ODE solver ODE-S1 430 is an adaptive step size solver, the tolerance of the first ODE solver ODE-S1 430 may be increased.

This adapted forward pass, in which both the first ODE solver and the second ODE solver are used and as shown in FIG. 4b, may be repeated at regular or irregular intervals during the training. For example, the adapted forward pass may be applied after a predefined number of iterations of the training, such as every 50 iterations. The adapted forward pass may be repeated periodically or aperiodically until the training is ended or is completed. The adapted forward pass may be repeated according to a schedule, and the intervals between repeats of the adapted forward pass may be regular or irregular. In some embodiments, the use of the adapted forward pass may be triggered by an event, such as when the loss value changes by more than a threshold over a predetermined number of iterations. The frequency of the adapted forward pass being repeated may, in some embodiments, be based on the magnitude of the difference between the first performance value and the second performance value and the value of the threshold. For example, if the difference between the threshold and the magnitude of the difference between the first performance function and the second performance function is reducing, the frequency of the adapted forward pass may also reduce.

The first ODE solver ODE-S1 430 and the second ODE solver ODE-S2 435 may use different numerical solver methods. The second ODE solver ODE-S2 435 may have an equal or smaller expected discretization error than the first ODE solver ODE-S1 430. The second ODE solver ODE-S2 435 may have a higher convergence order than the first ODE solver ODE-S1 430. In other words, the second ODE solver ODE-S2 435 may be selected to have an equal or smaller expected discretization error than the first ODE solver ODE-S1 430. As will be understood, the expected discretisation error of an ODE solver may differ from the actual, e.g., achieved, discretisation error. However, such a discrepancy does not affect the efficacy of the method described herein. That is, the method remains effective even if the actual discretization error of the second ODE solver exceeds the actual discretization error of the first ODE solver.

For example, the first ODE solver ODE-S1 430 may be based on at least one of a Runge-Kutta method and a multistep method. Examples of Runge-Kutta methods include Euler's method, the midpoint method, Heun's method, classic higher-order Runge-Kutta (e.g., classic fourth-order Runge-Kutta) and Ralston's method. Examples of multistep methods include Adams-Bashforth, Adams-Moulton and Backward Differentiation Formulae (BDF). These methods may be used at a variety of orders. For example, Adams-Bashforth methods of orders 1 to 12 may be used. In some embodiments, such as embodiments in which the first ODE solver and the second ODE solver are adaptive step size solvers, the second ODE solver is based on an embedded higher-order method. For example, if the first ODE solver is based on Euler's method, then the second ODE solver may be based on the midpoint method. As a further example, if the first ODE solver is based on a second order Bogacki-Shampine method, the second ODE solver may be based on a third-order Ralston's method. As a further example, if the first ODE solver is based on an Adams-Bashforth method, the second ODE solver may be based on an Adams-Moulton method. Further examples of pairings between the first ODE solver and the second ODE solver include Dormand-Prince, Bogacki-Shampine, Heun-Euler and Tsitouras 5/4. It is to be understood that this list is merely exemplary, not exhaustive and the method described herein is not limited thereto.

This process may also be described in algorithmic form, as shown below in pseudocode:

```
initialize starting accuracy_param;
while Training do
    if Iteration % 50 == 0 then
        test_performance =
            calculate_performance_second_ODE_solver;
```

-continued

```
        if difference(test_performance, train_performance) > 0.1 then
            new_accuracy_param = 0.5*accuracy_param;
        else
            new_accuracy_param = 1.1*accuracy_param;
        end
    end
end
``` where train_performance is used to denote the performance of the first ODE solver and test_performance is used to denote the performance of the second ODE solver. The performance may be a loss function, an accuracy or the like. In some embodiments, the test performance and the train performance (e.g., the second performance value and the first performance value, respectively) may be multidimensional. In such cases, determining the difference between the first performance value and the second performance value may comprise determining a Euclidean distance or the like. The value used as the threshold (0.1), the frequency of the adapted forward pass (every 50 iterations) and the values used to adapt the accuracy parameter (0.5 and 1.1) are purely for the sake of illustration and it is to be understood that the method described herein is not limited thereto.

Throughout the training of the neural network, parameters and weights of the neural network, e.g the upstream block, the neural ODE block and the downstream block, may be updated, for example by optimizing a loss function, over a plurality of iterations. At various points during the training, the adapted forward pass is used to adjust the accuracy parameter of the first ODE solver. For example, training the neural network may comprise 50 iterations during which the parameters and weights are updated by optimizing a loss function (this may be referred to as a "normal forward pass"), one iteration during which the accuracy parameter of the first ODE solver is adjusted (e.g., by the adapted forward pass described above), followed by 50 iterations of the normal forward pass, one iteration of the adapted forward pass, and so on, until training ends. Although this example refers to a periodic use of the adapted forward pass, it is to be understood that this is not limiting. In some embodiments, the adapted forward pass is applied sporadically, or aperiodically, at irregular intervals.

Figure 4C:
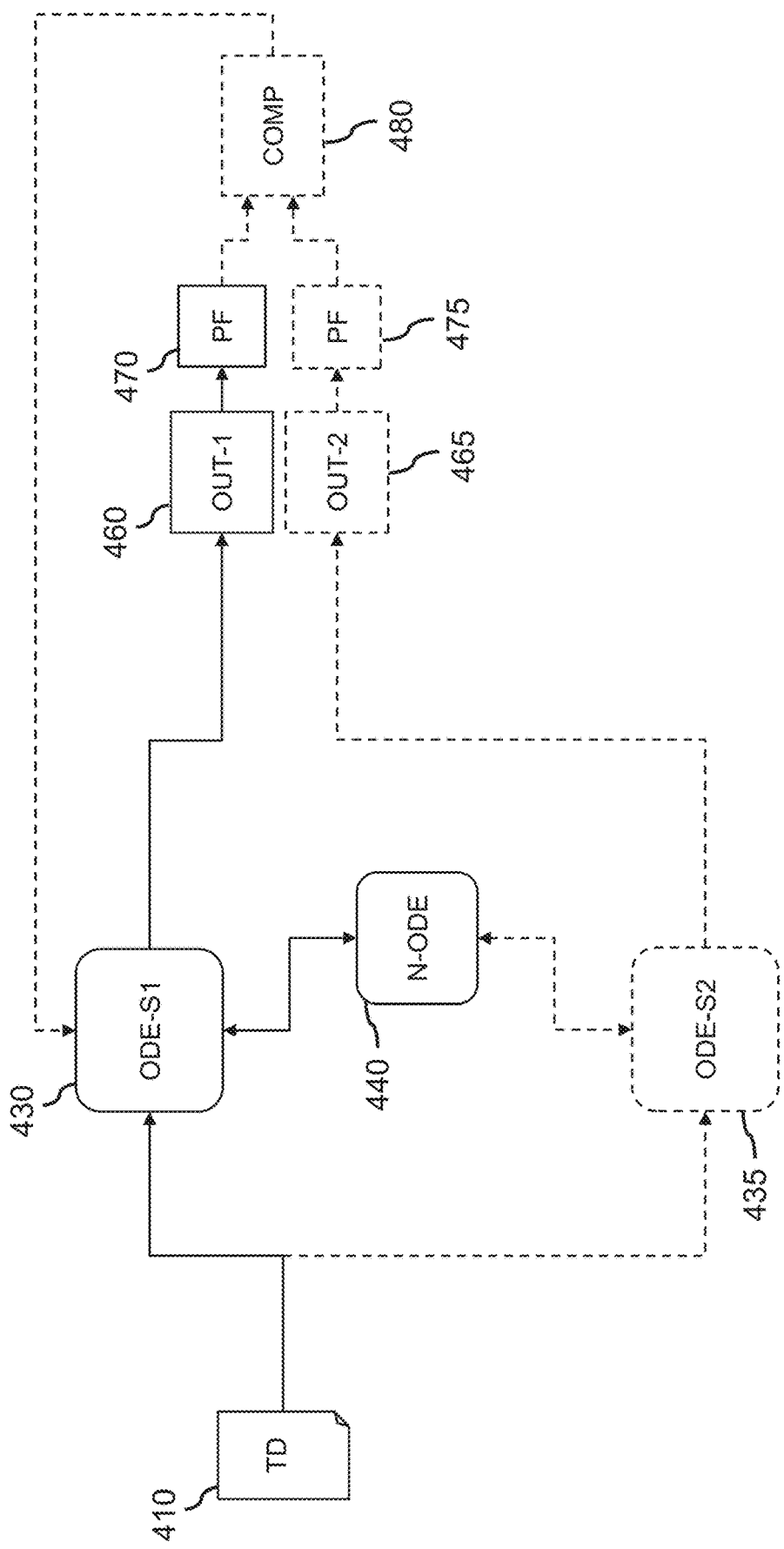
FIG. 4c shows a detailed example of training a neural network comprising a neural ODE block according to an example embodiment of the present invention.

Although the description has thus far referred to examples in which the neural network comprises an upstream block and a downstream block, it is to be understood that these are optional. Such an embodiment is illustrated in FIG. 4c. In some embodiments, the input may be merely fed to the first ODE solver ODE-S1 430 via an input layer. In other words, in some embodiments, there may be no layers between the input layer and the neural ODE block N-ODE 440. Additionally or alternatively, the output OUT-1 460 of the ODE solver ODE-S1 430 may be used to calculate the performance value. In other words, in some embodiments, the output of the ODE solver may be the output of the neural network. There may be no layers between the neural ODE block N-ODE 440 and an output layer.

In other words, FIG. 4c illustrates an embodiment in which the neural network consists of the neural ODE block without additional upstream or downstream layers. The input layer and the output layer of the neural network are not shown for simplicity, as in the simplest case these layers may merely pass the training element(s) or output(s) without providing any modifications thereto. This is purely exemplary. In some embodiments, the neural network may comprise either the upstream block as described above, or the downstream block as described above, or both.

In the embodiments illustrated by FIG. 4c, the adapted forward pass is similarly adjusted. That is, the training data TD 410 may be input to the second ODE solver ODE-S2 435. The output OUT-2 465 of the second ODE solver ODE-S2 435 may be input into the performance function PF 475.

Although only one neural ODE block N-ODE 440 is depicted in FIG. 4c, it is to be understood that the method described herein may be applied to a neural network comprising multiple neural ODE blocks. In some such embodiments, each neural ODE block may be called by a respective ODE solver, or the same ODE solver may be used to call multiple neural ODE blocks.

Figure 5:
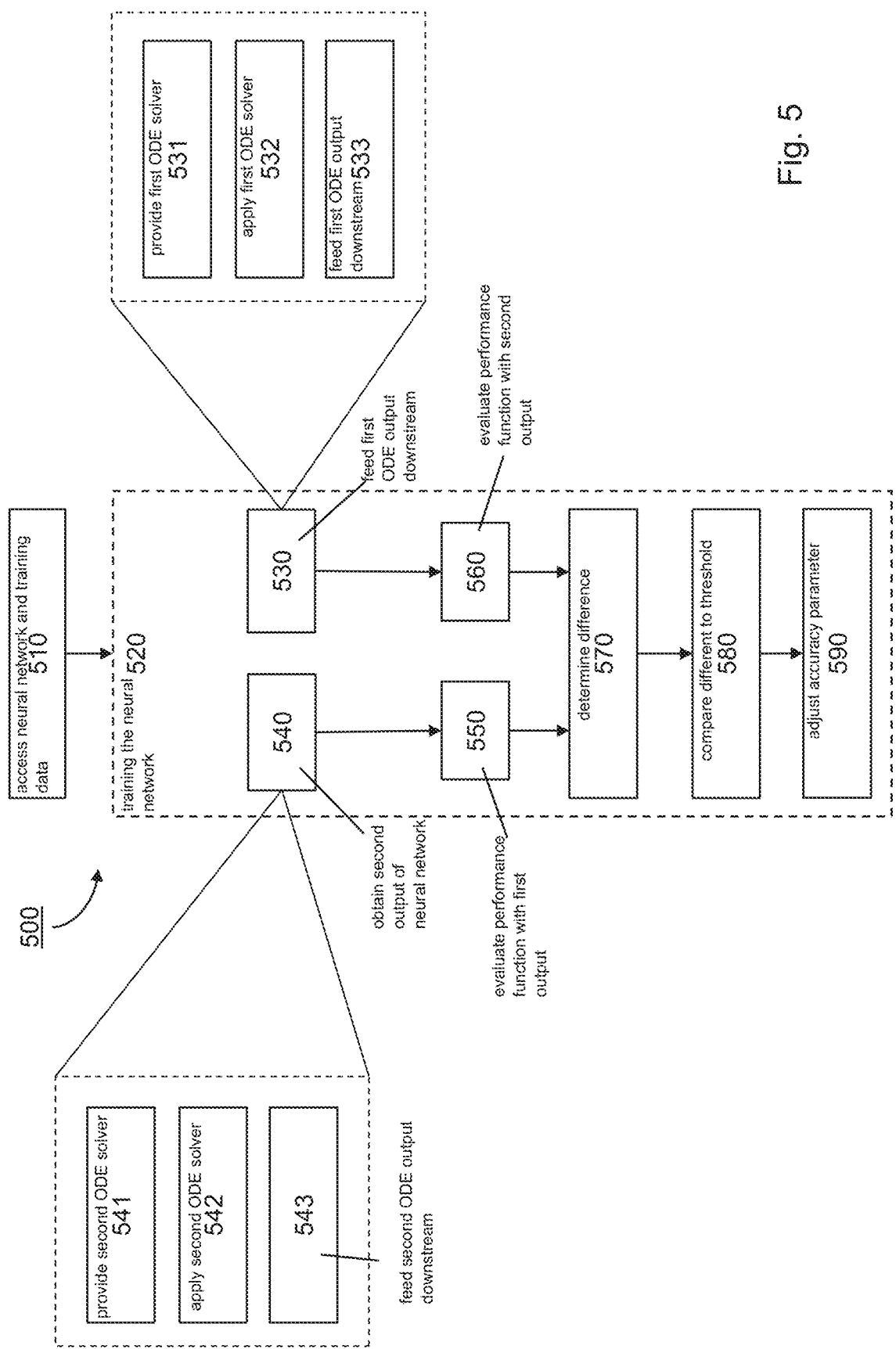
FIG. 5 shows a computer-implemented method of training a neural network comprising a neural ODE block according to an example embodiment of the present invention.

FIG. 5 shows a computer-implemented method 500 of training a neural network comprising a neural ODE block according to an embodiment of the present invention. The neural network comprises a neural ODE block. In some embodiments, the neural network may further comprise an upstream block and/or a downstream block. The upstream block refers to the layers of the neural network which are upstream of the neural ODE block, and the downstream block refers to the layers of the neural network which are downstream of the neural ODE block. The method 500 may correspond to an operation of the training system 100 of FIG. 1. However, this is not a limitation, in that the method 500 may also be performed using another system, apparatus or device.

The method 500 may comprise, in an operation entitled "ACCESS NEURAL NETWORK AND TRAINING DATA", accessing 510 model data defining the neural network and accessing 510 a training dataset comprising a plurality of batches of training data. Each element of the training dataset may comprise an input instance and a corresponding ground truth.

The method 500 may comprise, in an operation entitled "TRAINING THE NEURAL NETWORK", training 520 the neural network on the training dataset and using a first ODE solver. In some embodiments, the neural network may comprise the first ODE solver. In other embodiments, the first ODE solver may be external to the neural network.

During the training 520, the method may further comprise accessing a second ODE solver. The second ODE solver is preferably different than the first ODE solver. In some embodiments, the second ODE solver is based on a different numerical solving method than the first ODE solver. Training 520 the neural network may comprise initialising an accuracy parameter of the first ODE solver and adjusting the accuracy parameter during the training.

During a forward pass of the training 520 of the neural network, the method 500 may comprise, in an operation entitled "OBTAINING FIRST OUTPUT OF NEURAL NETWORK", obtaining 530 a first output of the neural network.

Obtaining 530 the first output of the neural network may comprise, in an operation entitled "PROVIDING FIRST ODE SOLVER", providing 531 a layer output upstream of the neural ODE block to the first ODE solver. In some embodiments, the layer output upstream of the neural ODE block may be the input to the neural network, e.g., the training data. In some embodiments, the layer output upstream of the neural ODE block may be the output of the upstream block. That is, after a batch of training data has been fed to the upstream layers, e.g., the upstream block, of the neural network, the output of the upstream block may be obtained and fed to the first ODE solver.

Obtaining 530 the first output of the neural network may comprise, in an operation entitled "APPLYING FIRST ODE SOLVER", applying 532 the first ODE solver to the neural ODE block to obtain an output of the first ODE solver. In other words, the first ODE solver calls the neural ODE block.

Obtaining 530 the first output of the neural network may comprise, in an operation entitled "FEEDING FIRST ODE OUTPUT DOWNSTREAM", feeding 533 the output of the first ODE solver into a layer downstream of the neural ODE block. In some embodiments, feeding 533 the output of the first ODE solver may comprise feeding the output of the first ODE solver to the downstream block. In some embodiments, feeding 533 the output of the first ODE solver may comprise outputting the output of the first ODE solver as the output of the neural network via an output layer.

During the forward pass of the training 520 of the neural network, the method 500 may comprise, in an operation entitled "OBTAINING SECOND OUTPUT OF NEURAL NETWORK", obtaining 540 a second output of the neural network. The operations of obtaining 530 the first output of the neural network and obtaining 540 the second output of the neural network may be performed simultaneously, substantially simultaneously or sequentially.

Obtaining 540 the second output of the neural network may comprise, in an operation entitled "PROVIDING SECOND ODE SOLVER", providing 541 the layer output upstream of the neural ODE block to the second ODE solver. In some embodiments, the layer output upstream of the neural ODE block may be the input into the neural network, e.g., the training data. In some embodiments, the layer output upstream of the neural ODE block may be an output of the upstream block. That is, after the batch of training data has been fed to the upstream layers, e.g., the upstream block, of the neural network, the output of the upstream block may be obtained and fed to the second ODE solver.

Obtaining 540 the second output of the neural network may comprise, in an operation entitled "APPLYING SECOND ODE SOLVER", applying 542 the second ODE solver to the neural ODE block to obtain an output of the second ODE solver. In other words, the second ODE solver calls the neural ODE block.

Obtaining 540 the second output of the neural network may comprise, in an operation entitled "FEEDING SECOND ODE OUTPUT DOWNSTREAM", feeding 543 the output of the second ODE solver into the layer downstream of the neural ODE block. In some embodiments, feeding 543 the output of the second ODE solver into the layer downstream of the neural ODE block may comprise feeding the output of the second ODE solver to the downstream block. In some embodiments, feeding 543 the output of the second ODE solver may comprise outputting the output of the second ODE solver as the output of the neural network. In other words, in some embodiments, the layer downstream of the neural ODE block may be the output layer.

After obtaining the first output of the neural network and the second output of the neural network, the method 500 comprises, in an operation entitled "EVALUATING PERFORMANCE FUNCTION WITH FIRST OUTPUT", evaluating 550 a performance function using the first output of the neural network to obtain a first performance value. The performance function may quantify a performance characteristic of the neural network with respect to a batch of training data. That is, the first performance value corresponds to a performance value obtained when the first ODE solver is applied to the neural ODE block. The performance function may be a loss function, an accuracy function or the like. The first performance value may be a loss value, an accuracy value or the like. In some embodiments, the performance value may be the output of the respective ODE solver or the output of the neural network. The performance function may be a loss function, which may take the form of an averaged cross-entropy loss with or without regularization terms or any other loss function. In some embodiments, the performance function may be a loss function.

Either sequentially or simultaneously, or substantially simultaneously, the method 500 comprises, in an operation entitled "EVALUATING PERFORMANCE FUNCTION WITH SECOND OUTPUT", evaluating 560 the performance function using the second output of the neural network to obtain a second performance value. That is, the second performance value corresponds to a performance value obtained when the second ODE solver is applied to the neural ODE block. The performance function used in operation 550 may be the same performance function as that used in operation 560. The first performance value and the second performance value are determined independently of each other.

After evaluating the performance function and obtaining the first performance value and the second performance value, the method may further comprise, in an operation entitled "DETERMINING DIFFERENCE", determining 570 a difference between the first performance value and the second performance value.

The method may further comprise, in an operation entitled "COMPARING DIFFERENCE TO THRESHOLD", comparing 580 a magnitude of the difference between the first performance value and the second performance value to a threshold.

The method further comprises, in an operation entitled "ADJUSTING THE ACCURACY PARAMETER", adjusting 590 the accuracy parameter of the first ODE solver based on a difference between the first performance value and the second performance value. In some embodiments, adjusting the accuracy parameter of the first ODE solver may be based on the comparison of the magnitude of the difference to the threshold. In some embodiments, adjusting the accuracy parameter of the first ODE solver may be based on a ratio between the first performance value and the second performance value, or any other comparative metric. In some embodiments, for example if the first ODE solver is a fixed step size solver, adjusting the accuracy parameter of the first ODE solver may comprise adjusting a step size of the first ODE solver. For example, if the magnitude of the difference is greater than the threshold, adjusting the accuracy parameter may comprise decreasing the step size of the first ODE solver. If the magnitude of the difference is less than the threshold, the step size of the first ODE solver may be increased. In some embodiments, decreasing the step size may comprise multiplying the current step size by a predetermined value, the predetermined value being a number between 0 and 1. In some embodiments, increasing the step size may comprise multiplying the current step size by a further predetermined value, the further predetermined value being a number greater than 1.

In some embodiments of the present invention, the accuracy parameter may be a tolerance, for example if the first ODE solver is an adaptive step size solver. For example, if the magnitude of the difference between the first performance value and the second performance value is greater than the threshold, adjusting the accuracy parameter may comprise decreasing the tolerance of the first ODE solver. If the magnitude of the difference between the first performance value and the second performance value is less than the threshold, adjusting the accuracy parameter may comprise increasing the tolerance of the first ODE solver. Increasing the tolerance of the first ODE solver may comprise multiplying the current tolerance by a predetermined value greater than 1. Decreasing the tolerance of the first ODE solver may comprise multiplying the current tolerance by a predetermined value between 0 and 1.

The operations 530 to 590 may be performed during a forward pass of an iteration of training. These operations 530 to 590 may be repeated intermittently, e.g., periodically or aperiodically, during the training of the neural network. In some embodiments, the operations 530 to 590 may be repeated either periodically, such as after a predetermined number of iterations, e.g., every 50 iterations, or aperiodically, until the training of the neural network is ended.

In some embodiments of the present invention, the method 500 further comprises outputting the model data representing the trained neural network. In some embodiments, the method further comprises receiving an image as an input to the neural network and classifying the image into at least one of a plurality of classes. For example, the image may be an image representation of an input, such as sensor data, audio, text, video or the like. Although the example of image classification has been used, it is to be understood that the method of training the neural network may be applied to any forward-feed neural network.

It will be appreciated that, in general, the operations of method 500 of FIG. 5 may be performed in any suitable order, e.g., consecutively, simultaneously, or a combination thereof, subject to, where applicable, a particular order being necessitated, e.g., by input/output relations. For example, the operations 530 and 540 may be performed in any order or simultaneously, and operations 550 and 560 may be performed in any order or simultaneously. As a further example, operation 550 may be performed after operation 530 and operation 560 may be performed after operation 540.

Figure 6:
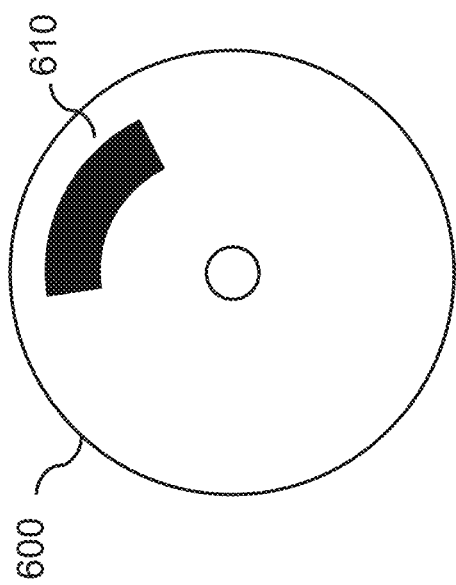
FIG. 6 shows a computer-readable medium comprising data.

The method(s) may be implemented on a computer as a computer-implemented method, as dedicated hardware, or as a combination of both. As also illustrated in FIG. 6, instructions for the computer, e.g., executable code, may be stored on a computer readable medium 600, e.g., in the form of a series 610 of machine-readable physical marks and/or as a series of elements having different electrical, e.g., magnetic, or optical properties or values. The executable code may be stored in a transitory or non-transitory manner. Examples of computer readable mediums include memory devices, optical storage devices, integrated circuits, servers, online software, etc. FIG. 6 shows an optical disc 600.

It should be noted that the above-mentioned embodiments illustrate rather than limit the present invention, and that those skilled in the art will be able to design many alternative embodiments, in view of the disclosure herein.

Herein, use of the verb "comprise" and its conjugations does not exclude the presence of elements or steps other than those stated. The article "a" or "an" preceding an element does not exclude the presence of a plurality of such elements. Expressions such as "at least one of" when preceding a list or group of elements represent a selection of all or of any subset of elements from the list or group. For example, the expression, "at least one of A, B, and C" should be understood as including only A, only B, only C, both A and B, both A and C, both B and C, or all of A, B, and C. The present invention may be implemented by means of hardware comprising several distinct elements, and by means of a suitably programmed computer. In the device including several means, several of these means may be embodied by one and the same item of hardware. The mere fact that certain measures are described separately does not indicate that a combination of these measures cannot be used to advantage.

What is claimed is:

1. A computer-implemented method for training a neural network, the neural network including a neural ordinary differential equation (ODE) block, the method comprising the following steps:
   accessing model data defining the neural network;
   accessing a training dataset including a plurality of batches of training data; and
   training the neural network on the training dataset and using a first ordinary differential equation (ODE) solver;
   wherein the method further comprises accessing a second ODE solver, wherein the second ODE solver uses a different numerical solving method than a numerical solving method of the first ODE solver; and
   wherein the training includes:
      initializing an accuracy parameter of the first ODE solver, and
      during a forward pass of an iteration of the training, adjusting the accuracy parameter of the first ODS solver by:
         obtaining a first output of the neural network by:
            providing a layer output of a layer upstream in the neural network of the neural ODE block to the first ODE solver,
            applying the first ODE solver to the neural ODE block to obtain an output of the first ODE solver, and
            feeding the output of the first ODE solver into a layer downstream in the neural network of the neural ODE block;
         obtaining a second output of the neural network by:
            providing the layer output of the layer upstream in the neural network of the neural ODE block to the second ODE solver,
            applying the second ODE solver to the neural ODE block to obtain an output of the second ODE solver, and
            feeding the output of the second ODE solver into the layer downstream in the neural network of the neural ODE block;
         evaluating a performance function using the first output of the neural network to obtain a first performance value, the performance function quantifying a performance characteristic of the neural network with respect to a batch of training data;
         evaluating the performance function using the second output of the neural network to obtain a second performance value; and
         adjusting the accuracy parameter of the first ODE solver based on a difference between the first performance value and the second performance value;
      wherein the numerical solving method of the first ODE solver is a Euler's method, and the numerical solving method of the second ODE solver is a midpoint method.

2. The computer-implemented method of claim 1, further comprising:
   comparing a magnitude of the difference between the first performance value and the second performance value to a threshold;
   wherein the adjusting of the accuracy parameter of the first ODE solver includes adjusting the accuracy parameter based on the comparison of the magnitude of the difference to the threshold.

3. The computer-implemented method of claim 2, wherein the accuracy parameter is a tolerance, and wherein adjusting the accuracy parameter based on the comparison of the magnitude of the difference to the threshold includes:
when the magnitude of the difference is greater than the threshold, decreasing the tolerance of the first ODE solver, and when the magnitude of the difference is below the threshold, increasing the tolerance of the first ODE solver.

4. The computer-implemented method of claim 2, wherein the accuracy parameter is a step size, and wherein adjusting the accuracy parameter based on the comparison of the magnitude of the difference to the threshold includes:
when the magnitude of the difference is greater than the threshold, decreasing the step size of the first ODE solver, and when the magnitude of the difference is below the threshold, increasing the step size of the first ODE solver.

5. The computer-implemented method of claim 4, wherein the second ODE solver is of convergence order higher than the first ODE solver.

6. The computer-implemented method of claim 1, wherein the second ODE solver is selected to have an equal or smaller expected discretization error than the first ODE solver.

7. The computer-implemented method of claim 1, wherein the neural network is an image classifier, the image classifier being configured to accept an image as an input and to classify the image into at least one of a plurality of classes.

8. The computer-implemented method of claim 1, wherein the accuracy parameter is adjusted periodically during the training.

9. The computer-implemented method of claim 1, wherein the accuracy parameter is adjusted after every predefined number of iterations.

10. The computer-implemented method of claim 1, wherein the accuracy parameter is adjusted aperiodically during the training.

11. The computer-implemented method of claim 1, further comprising:
repeating the adjusting of the accuracy parameter until the training of the neural network is ended.

12. The computer-implemented method of claim 1, further comprising:
outputting model data representing the trained neural network.

13. The computer-implemented method of claim 1 further comprising:
receiving an image as an input to the neural network and classifying the image into at least one of a plurality of classes.

14. A computer implemented method for training a neural network, the neural network including a neural ordinary differential equation (ODE) block, the method comprising the following steps:
accessing model data defining the neural network;
accessing a training dataset including a plurality of batches of training data; and
training the neural network on the training dataset and using a first ordinary differential equation (ODE) solver;
wherein the method further comprises accessing a second ODE solver, wherein the second ODE solver uses a different numerical solving method than a numerical solving method of the first ODE solver; and
wherein the training includes:
initializing an accuracy parameter of the first ODE solver, and
during a forward pass of an iteration of the training of the neural network, adjusting the accuracy parameter during the training by:
obtaining a first output of the neural network by:
providing a layer output of a layer upstream in the neural network of the neural ODE block to the first ODE solver,
applying the first ODE solver to the neural ODE block to obtain an output of the first ODE solver, and
feeding the output of the first ODE solver into a layer downstream in the neural network of the neural ODE block;
obtaining a second output of the neural network by:
providing the layer output of the layer of the neural network upstream in the neural network of the neural ODE block to the second ODE solver,
applying the second ODE solver to the neural ODE block to obtain an output of the second ODE solver, and
feeding the output of the second ODE solver into the layer downstream in the neural network of the neural ODE block;
evaluating a performance function using the first output of the neural network to obtain a first performance value, the performance function quantifying a performance characteristic of the neural network with respect to a batch of training data;
evaluating the performance function using the second output of the neural network to obtain a second performance value; and
adjusting the accuracy parameter of the first ODE solver based on a difference between the first performance value and the second performance value;
wherein the numerical solving method of the first ODE solver is a second order Bogacki-Shampine method, and the numerical solving method of the second ODE solver is a third-order Ralston's method.

15. A computer implemented method for training a neural network, the neural network including a neural ordinary differential equation (ODE) block, the method comprising the following steps:
accessing model data defining the neural network;
accessing a training dataset including a plurality of batches of training data; and
training the neural network on the training dataset and using a first ordinary differential equation (ODE) solver;
wherein the method further comprises accessing a second ODE solver, wherein the second ODE solver uses a different numerical solving method than a numerical solving method of the first ODE solver; and
wherein the training includes:
initializing an accuracy parameter of the first ODE solver, and during a forward pass of an iteration of the training, adjusting the accuracy parameter during the training by:
  obtaining a first output of the neural network by:
    providing a layer output of a layer upstream in the neural network of the neural ODE block to the first ODE solver,
    applying the first ODE solver to the neural ODE block to obtain an output of the first ODE solver, and
    feeding the output of the first ODE solver into a layer downstream in the neural network of the neural ODE block;
  obtaining a second output of the neural network by:
    providing the layer output of the layer upstream in the neural network of the neural ODE block to the second ODE solver,
    applying the second ODE solver to the neural ODE block to obtain an output of the second ODE solver, and
    feeding the output of the second ODE solver into the layer downstream in the neural network of the neural ODE block;
  evaluating a performance function using the first output of the neural network to obtain a first performance value, the performance function quantifying a performance characteristic of the neural network with respect to a batch of training data;
  evaluating the performance function using the second output of the neural network to obtain a second performance value; and
  adjusting the accuracy parameter of the first ODE solver based on a difference between the first performance value and the second performance value;
wherein the numerical solving method of first ODE solver is a Adams-Bashforth method, and the numerical solving method of the second ODE solver is a Adams-Moulton method.

16. The computer-implemented method of claim 14, further comprising:
  comparing a magnitude of the difference between the first performance value and the second performance value to a threshold;
  wherein the adjusting of the accuracy parameter includes adjusting the accuracy parameter based on the comparison of the magnitude of the difference to the threshold.

17. The computer-implemented method of claim 16, wherein the accuracy parameter is a tolerance, and wherein adjusting the accuracy parameter based on the comparison of the magnitude of the difference to the threshold includes:
  when the magnitude of the difference is greater than the threshold, decreasing the tolerance of the first ODE solver, and when the magnitude of the difference is below the threshold, increasing the tolerance of the first ODE solver.

18. The computer-implemented method of claim 16, wherein the accuracy parameter is a step size, and wherein adjusting the accuracy parameter based on the comparison of the magnitude of the difference to the threshold includes:
  when the magnitude of the difference is greater than the threshold, decreasing the step size of the first ODE solver, and when the magnitude of the difference is below the threshold, increasing the step size of the first ODE solver.

19. The computer-implemented method of claim 11, wherein the second ODE solver verifies that the first ODE solver is configured to ensure that the neural ODE block is not dependent on the numerical method of the first ODE solver.

20. The computer-implemented method of claim 11, the second ODE solver is used to ensure that the neural network including the neural ODE block is trained to behave as an ODE flow during the training, enabling the trained network to have a valid ODE flow semantic.

21. The computer-implemented method of claim 11, wherein the second ODE solver verifies that the neural ODE block is not dependent on the numerical solving method of the first ODE solver by checking to see whether the neural ODE block using the different numerical solving method would yield the same solution or a solution within a predetermined threshold.

* * * * *